2,536,406

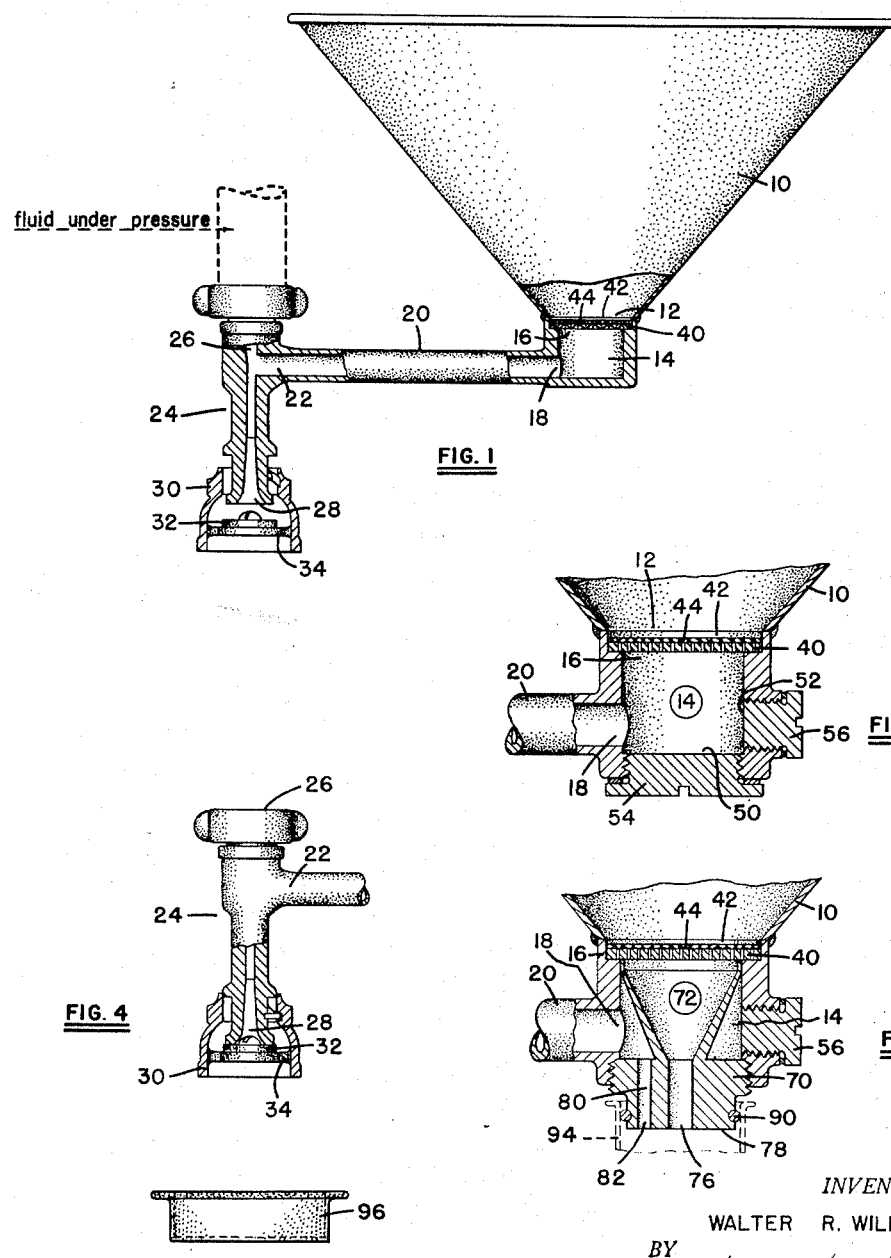
Jan. 2, 1951 — W. R. WILBORN — 2,536,406
CREAM SEDIMENT TESTER
Filed Aug. 17, 1949
INVENTOR.
WALTER R. WILBORN Patented Jan. 2, 1951

UNITED STATES PATENT OFFICE 2,536,406

CREAM SEDIMENT TESTER

Walter R. Wilborn, Cincinnati, Ohio

Application August 17, 1949, Serial No. 110,833

7 Claims. (Cl. 73—61)

This invention relates to a sediment tester and more particularly to a sediment tester of the type used by the dairy industry in testing samples of milk products for foreign material.

An object of the invention is to provide a tester for the dairy industry which will facilitate the making of quick, accurate sediment tests of products such as, by way of example, raw milk.

Another object of the invention is to provide a device which will greatly increase the speed and facility with which so-called sediment tests may be made, it being noted that the device is constructed so as to selectively save or discard samples of the fluid being tested.

A further object of the invention is to provide a tester of the type in which individual filter disks are adapted to be used, one for each sample of fluid to be tested.

Still a further object of the invention is to provide a sediment tester having the hereinabove described characteristics, which is constructed in such a manner as to be operatively mounted in an upright position to a source of fluid under pressure. In those instances where the fluid being tested is to be discarded, such fluid, after passing through a suitable filtering element, is automatically siphoned into a stream of flowing water. In those instances when it is desirable to save the fluid being tested, a suitable container may be readily associated with the device for enabling the filtered fluid to be saved.

Another object of the invention is to provide a sediment tester in combination with a reversible flow aspirator, which may be manipulated for effecting a reverse flow of fluid under pressure into the testing device for effecting cleansing thereof.

A further object of the invention is to provide a sediment tester which comprises a minimum number of parts, each of which is so constructed whereby to facilitate rapid, thorough and effective cleansing in accordance with the various local, state and federal regulations pertaining thereto.

Another object of the invention is to provide a sediment tester of the reverse flow type which is constructed in such a manner as to be operatively mounted in an upstanding position when connected to a suitable source of fluid under pressure, such as, by way of example, to a water line.

Still another object of the invention is to provide a sediment tester having the hereinabove described characteristics, which is sturdy and which lends itself to production using modern mass production techniques.

These and other objects are attained by the means described herein and as disclosed in the accompanying drawings in which:

Fig. 1 is a side view, partly in section disclosing one form of the invention.

Fig. 2 is an enlarged fragmentary sectional view disclosing a modified form of construction.

Fig. 3 is a view similar to Fig. 2 but illustrating a universal member operatively associated with the device.

Fig. 4 is a view of the aspirator of Fig. 1, with the parts in position for effecting a reverse flow of fluid through the device in Fig. 1.

Fig. 5 is a side view of a cap member comprising a detail of the invention.

With reference to Fig. 1, the numeral 10 indicates a receptacle characterized by its downwardly convergent wide walls, the lower ends of which terminate in and define a discharge throat 12.

A chamber, denoted generally by the numeral 14 is located below throat 12. In Fig. 1 this chamber may be considered as having two ports, 16 and 18, wherein port 16 is disposed in open communication with throat 12.

Port 18 is connected by any suitable means, such as conduit 20, to the suction line 22 of a reverse flow aspirator denoted generally by the numeral 24. The present invention is not directed to nor concerned with the particular details of the aspirator except that it includes, in addition to the suction line, an inlet line 26, an outlet line 28 and some sort of manually operable means such as, by way of example, a sleeve 30 which is shiftable from one to the other of the two normal positions illustrated in Figs. 1 and 4. A valve seat 32 may be secured to and carried by a spider 34 secured to sleeve 30. When sleeve 30 is in the lowered position of Fig. 1, fluid entering inlet line 26 will pass downwardly through the aspirator and be discharged through outlet line 28 during which time a suction will be created in line 22, conduit 20 and chamber 14.

In the preferred embodiment of the invention a perforate member 40 is provided in spanning relationship with throat 12 and a filter seat 42 is provided immediately above said perforate member. Seat 42 is dimensioned to center a filter element, denoted generally by the numeral 44 which may be supported upon the perforate member. Preferably though not necessarily the filter element may comprise an inexpensive filter paper disk.

From the foregoing it will be noted that a sample of fluid poured into receptacle 10 upon filter element 44 will be drawn through the filter element by reason of the suction created in chamber 14 incident to a flow of fluid through the aspirator of Fig. 1.

After the test sample has been exhausted into chamber 14, the filter element may be removed by means of a pair of tweezers, or the like, for inspection and analysis. As soon as the first filter element has been removed, it may be replaced by a new or clean filter element, after which another sample of fluid may be tested.

It will be observed that the fluid entering chamber 14 will be automatically disposed of, being discharged into the stream of fluid exhausted through outlet port 28.

In those instances when it becomes necessary or desirable to cleanse conduit 20, chamber 14, perforate member 40 and receptacle 10, sleeve 30 may be shifted to the position illustrated in Fig. 4 for deflecting the water entering inlet 26 into the suction line, thereby effecting a so-called reverse flow. Repeated manipulation of sleeve 30 will effect a thorough cleansing of the various parts of the device.

With reference now to Fig. 2, it will be noted that a port 50 has been provided in chamber 14 remote from but in axial alignment with port 16, and that port 52 has been provided in axial alignment with port 18, and the interior of conduit 20. A closure member 54 may threadably engage port 50 for controlling access to the interior of chamber 14 and the underside of perforate member 40. A second closure member 56 may threadably engage port 52 for controlling access to the interior of conduit 20.

In those instances where it becomes necessary or desirable to save the fluid being filtered, the set-up disclosed in Fig. 3 may be utilized. Closure member 54 has been replaced by a member denoted generally by the numeral 70 which includes a hollow upwardly projecting central portion 72 terminating in an upper periphery constructed and arranged to engage port 16 immediately below and preferably in contact with the outer edge of the under side of the perforate member 40. The lower end of central portion 72 terminates in port 76 in lower face 78 of member 70. A passageway 80 is likewise provided in open communication with the interior of chamber 14, terminating at one end in port 82 in face 78, as illustrated.

Suitable means, such as, by way of example, an O ring 90 may be mounted in a groove provided around the lower portion of member 70 for facilitating the temporary attachment of a suitable container 94 into which the fluid being tested will be discharged via port 76 and thus be saved.

Each time a new sample is to be tested a filter element 44 is disposed in seat 42 and a clean container 94 secured to member 70.

In those instances when it is desirable or necessary to selectively save and discard various of the test samples, a suitable cap member 96, Fig. 5, may be secured to member 70 in lieu of a container such as 94 whenever it is desired to discard the sample. The effect of placing cap member 96 over the end of member 70 is to interconnect ports 76 and 82 for directing the fluid being tested directly into the suction line of the aspirator via passageway 80, to obtain an overall effect the same as with the device illustrated in Figs. 1 and 2.

It should be understood that various changes and modifications in the structural details of the device may be made, such as, by way of example, substituting other attaching means in lieu of the O ring 90, and of making the receptacle detachable from chamber 14, within the scope of the appended claims, without departing from the spirit of the invention.

I claim:

1. A cream sediment tester comprising a receptacle defined by downwardly convergent walls which terminate in and define a discharge throat, a chamber including two ports, one in open communication with the discharge throat of said receptacle, a perforate member spanning said throat, a reversible flow aspirator including an inlet, an outlet and a suction line, means interconnecting the second of the two ports of said chamber to the suction line of said aspirator, a filter seat provided immediately above said perforate member dimensioned to center a filter element placed in said throat and supported on said perforate member, and means on the inlet line portion of said aspirator operable for connecting the inlet line of said aspirator to a source of fluid under pressure and for supporting said receptacle in upstanding, operative position.

2. A cream sediment tester comprising a receptacle defined by downwardly convergent walls which terminate in and define a discharge throat, a chamber including two ports, one in open communication with the discharge throat of said receptacle, a perforate member spanning said throat, a reversible flow aspirator including an inlet, an outlet and a suction line, means interconnecting the second of the two ports of said chamber to the suction line of said aspirator, a filter seat provided immediately above said perforate member dimensioned to center a filter element placed in said throat and supported on said perforate member, means operable for connecting the inlet line of said aspirator to a source of fluid under pressure for supporting said receptacle in upstanding, operative position, and closure means for the downstream side of said aspirator to effect a reverse flow of fluid under pressure through said suction line for cleansing said chamber and receptacle while supported in an upstanding, operative position.

3. A sediment tester comprising a receptacle defined by downwardly convergent walls which terminate in and define a discharge throat, a chamber including three ports, one in open communication with the discharge throat of said receptacle, the second port remote from and in axial alignment with said first port, a closure member engaging said second port for controlling access to the interior of said chamber, a reversible flow aspirator including an inlet, an outlet and a suction line, tubing interconnecting the third of the three ports of said chamber to the suction line of said aspirator, a perforate member spanning said throat, a filter seat provided immediately above said perforate member, and means operable for connecting the inlet line of said aspirator to a source of fluid under pressure.

4. A sediment tester comprising a receptacle defined by downwardly convergent walls which terminate in and define a discharge throat, a chamber including four ports, one in open communication with the discharge throat of said receptacle, the second port remote from and in axial alignment with said first port, a closure member engaging said second port for controlling access to the interior of said chamber, a reversible flow aspirator, including an inlet, an outlet and a suction line, tubing interconnecting the third of the four ports of said chamber to the suction line of said aspirator, the fourth port remote from and in axial alignment with said third port, a closure member for said fourth port for controlling access to the interior of the tubing interconnecting the suction line of said aspirator with the third port of said chamber, a perforate member spanning said throat, a filter seat provided immediately above said perforate member, and means on the inlet line portion of said aspirator for connecting the inlet line of said aspirator to a source of fluid under pressure, said means serving also to secure said receptacle in an upstanding, operative position.

5. A universal cream sediment tester of the type adapted to selectively discard or save the fluid being tested, comprising a receptacle defined by downwardly convergent walls which terminate in and define a discharge throat, a chamber including three ports, one in open communication with the discharge throat of said receptacle, the second remote from and in axial alignment with said first port, a perforate member spanning said throat, a reversible flow aspirator including an inlet, an outlet and a suction line, a conduit interconnecting the third of the three ports of said chamber to the suction line of said aspirator, a member engaging said second port including a hollow central portion having an upper end constructed and arranged to engage said first port below said perforate member, and as passageway in open communication with the interior of said chamber and said third port, one end of each of said central portion and passageway terminating in the bottom face of said member, and means for releasably attaching a container thereto into which the fluid being tested will be discharged and thus saved.

6. A universal cream sediment tester of the type adapted to selectively discard or save the fluid being tested, comprising a receptacle defined by downwardly convergent walls which terminate in and define a discharge throat, a chamber including three ports, one in open communication with the discharge throat of said receptacle, the second remote from and in axial alignment with said first port, a perforate member spanning said throat, a reversible flow aspirator including an inlet, an outlet and a suction line, a conduit interconnecting the third of the three ports of said chamber to the suction line of said aspirator, a member engaging said second port including a hollow central portion having an upper end constructed and arranged to engage said first port below said perforate member, and a passageway in open communication with the interior of said chamber and said third port, one end of each of said central portion and passageway terminating in the bottom face of said member, and means for releasably attaching a container thereto into which the fluid being tested will be discharged and thus saved, and a cap member constructed and arranged to be attached to said member in lieu of said container for interconnetcing said central portion with said passageway for directing the fluid being tested into the suction line of the aspirator.

7. A universal cream sediment tester of the type adapted to selectively discard or save the fluid being tested, comprising a receptacle defined by downwardly convergent walls which terminate in and define a discharge throat, a chamber including three ports, one in open communication with the discharge throat of said receptacle, the second remote from and in axial alignment with said first port, a perforate member spanning said throat, a filter seat provided immediately above said perforate member, a reversible flow aspirator including an inlet, an outlet and a suction line, means operable for connecting the inlet line of said aspirator to a source of fluid under pressure, a conduit interconnecting the third of the three ports of said chamber to the suction line of said aspirator, a member engaging said second port including a hollow central portion having an upper end constructed and arranged to engage said first port below said perforate member, and a passageway in open communication with the interior of said chamber and said third port, one end of each of said central portion and passageway terminating in the bottom face of said member, and means for releasably attaching a container thereto into which the fluid being tested will be discharged and thus saved.

WALTER R. WILBORN.

REFERENCES CITED

The following references are of record in the file of this patent:

UNITED STATES PATENTS

| Number | Name | Date |
| --- | --- | --- |
| 2,225,984 | Erekson | Dec. 24, 1940 |
| 2,515,522 | Lucas | July 18, 1950 |

OTHER REFERENCES

Clowes and Coleman: "Treatise on Qualitative Analysis" (9th ed., 1920), J. & A. Churchill, London. (Copy in Patent Office Library.)